(12) United States Patent
Toffle et al.

(10) Patent No.: US 8,174,796 B2
(45) Date of Patent: May 8, 2012

(54) BASEPLATE INTERCONNECT

(75) Inventors: Mark Toffle, St. Louis Park, MN (US); Wayne Allen Bonin, North Oaks, MN (US); Vincent John Reis, Mound, MN (US); Brent Marvin Weichelt, Burnsville, MN (US); Jason Paul Zimmerman, Savage, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 503 days.

(21) Appl. No.: 12/409,254

(22) Filed: Mar. 23, 2009

(65) Prior Publication Data

US 2009/0323225 A1 Dec. 31, 2009

Related U.S. Application Data

(60) Provisional application No. 61/038,497, filed on Mar. 21, 2008.

(51) Int. Cl.
*G11B 21/16* (2006.01)

(52) U.S. Cl. ........... 360/245.8; 360/245.2; 360/245.9

(58) Field of Classification Search .......... 360/245.8, 360/245.9, 264.2, 264.3
See application file for complete search history.

(56) References Cited

U.S. PATENT DOCUMENTS

| | | | | |
|---|---|---|---|---|
| 5,055,969 | A | * | 10/1991 | Putnam ............... 361/749 |
| 5,583,720 | A | * | 12/1996 | Ishida et al. ......... 360/97.01 |
| 5,668,684 | A | * | 9/1997 | Palmer et al. ........ 360/264.2 |
| 5,781,380 | A | * | 7/1998 | Berding et al. ...... 360/264.2 |
| 5,818,667 | A | * | 10/1998 | Larson ............... 360/264.2 |
| 6,002,551 | A | | 12/1999 | Goss et al. |
| 6,134,084 | A | * | 10/2000 | Ohwe et al. ......... 360/244.1 |
| 6,757,136 | B2 | | 6/2004 | Buske et al. |
| 2006/0227463 | A1 | | 10/2006 | Wright et al. |

* cited by examiner

*Primary Examiner* — Tan T. Nguyen

(74) *Attorney, Agent, or Firm* — McCarthy Law Group

(57) ABSTRACT

An actuator and associated method is provided, the actuator having an arm defining an aperture, an electrical circuit supported by the arm and terminating at a contact, a flexure assembly defining a boss and supporting a second electrical circuit terminating at a second contact, wherein the contacts are resultingly positioned in operable mating engagement with each other placing the electrical circuit in electrical communication with the second electrical circuit when the boss is operably disposed within the aperture and there affixed to the arm.

20 Claims, 7 Drawing Sheets

BASEPLATE INTERCONNECT

CROSS REFERENCE TO RELATED APPLICATION

This application claims the benefit of the earlier filing date of provisional application Ser. No. 61/038,497 filed Mar. 21, 2008.

FIELD

The present embodiments relate to data storage devices and more particularly without limitation to an apparatus and associated method for connecting a data transfer element within electrical circuitry.

BACKGROUND

Servo information is stored to media in a deliberate manner as part of the process of preparing the media for use in a data storage device. The servo information delineates the storage area in a data storage disc, for example, into addressable locations at the intersection of a designated radial position, such as track number, and a designated rotational position, such as sector number. Pluralities of discrete servo sectors form rings across the storage space, be they concentric or spiral rings. A data transfer element continuously feeds the servo information back to a servo control system as the element is moved about in the storage area. The control system utilizes the servo information to position the data transfer element, such as in deriving an optimal trajectory for moving the element to a desired track and maintaining the element at the desired track.

In addition to servowriting, media certification is also performed to verify the media's capability to store data and retain it. Generally, certification involves writing a preselected user data pattern in the storage area and then analyzing a readback signal for indications of any flaws in the media. A flaw may exist because of nonconformities in the media, or may be due to a presence of contamination or debris.

Both servowriting and certification entail carrying out relatively long processes within what is a highly automated and fast paced manufacturing system. Disruptions to production occur for either scheduled or unscheduled maintenance. For example, the data transfer elements are routinely switched out from time to time. Unscheduled switch-outs can occur when a data transfer element is damaged or when it is exhibiting nonconforming performance. Scheduled switch-outs can be performed at predetermined production intervals. Replacing a data transfer element is generally problematic because it and its associated electronics are permanently affixed to a support arm of the actuator.

The claimed embodiments are directed to improvements in both the effectiveness and the efficiency with which automated processes such as servowriting and certifying are performed.

SUMMARY OF THE INVENTION

In some embodiments an actuator is provided having an arm defining an aperture, an electrical circuit supported by the arm and terminating at a contact, and a flexure assembly defining a boss and supporting a second electrical circuit terminating at a second contact, wherein the contacts are resultingly positioned in operable mating engagement with each other placing the electrical circuit in electrical communication with the second electrical circuit when the boss is operably disposed within the aperture and there affixed to the arm.

In some embodiments a method is provided including steps of obtaining an arm defining an aperture and supporting an electrical circuit that terminates at a contact; expanding the aperture; obtaining a flexure assembly defining a boss and supporting a second electrical circuit that terminates at a second contact; positioning the flexure assembly to receivingly engage the boss within the aperture, thereby matingly engaging the contacts together; and contracting the aperture to affix the flexure assembly to the arm and resultingly affix the contacts together to operably interconnect the electrical circuits in electrical communication.

In some embodiments a media processing apparatus is provided having an amplifier and a data transfer member with an interconnecting electrical circuit therebetween, and means for connecting a first portion of the electrical circuit to a second portion of the electrical circuit so that an assembly that includes the data transfer member is a modular replaceable component.

DETAILED DESCRIPTION

Figure 1:
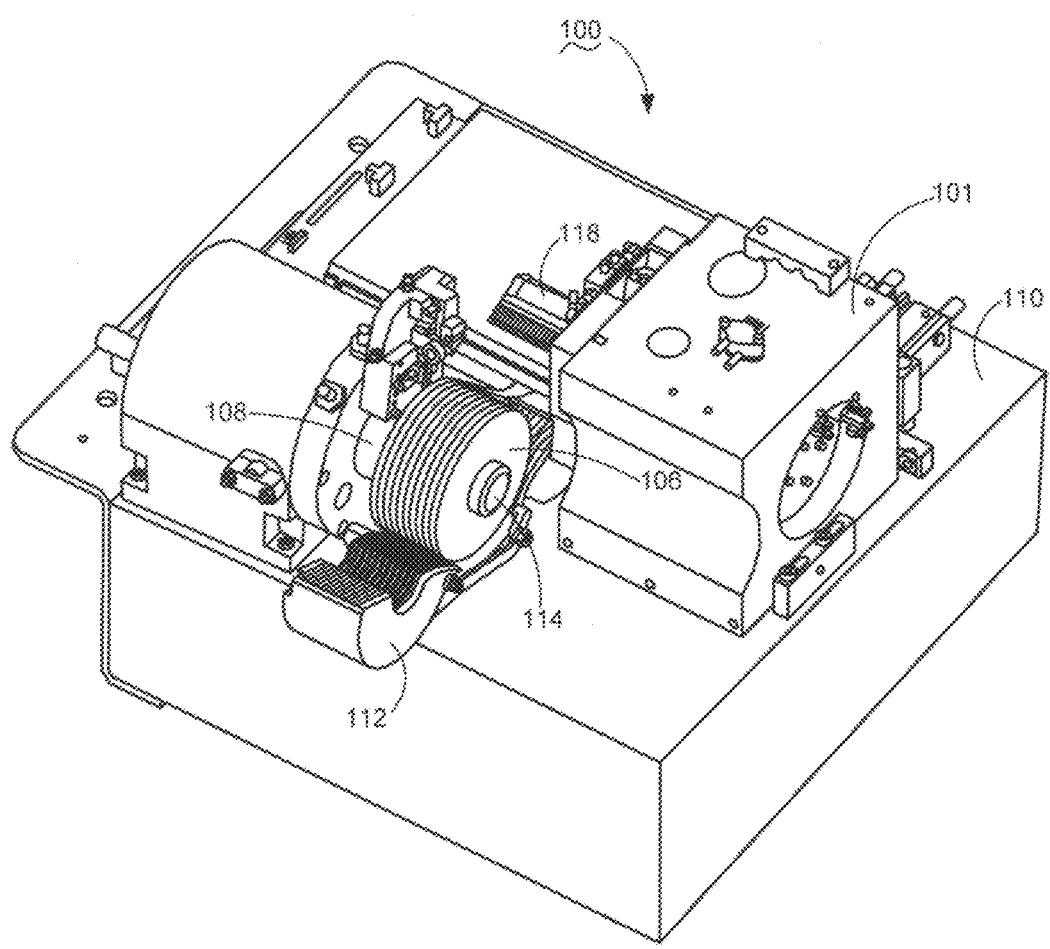
FIG. 1 is an isometric view of a media processing apparatus that is constructed in accordance with embodiments of the present invention.
Figure 2:
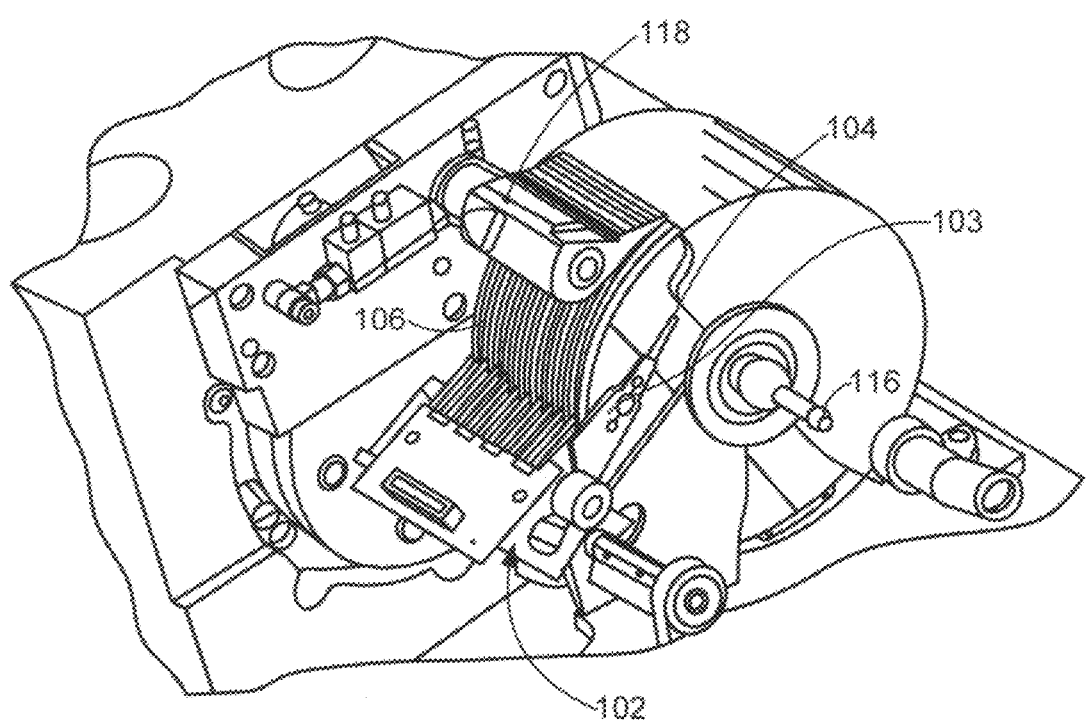
FIG. 2 is an enlarged view of a portion of the apparatus of FIG. 1.

FIGS. 1 and 2 are views of a media processing apparatus 100 that is constructed in accordance with the claimed embodiments. The apparatus 100 can be programmed to perform various processes such as servowriting and media certifying. Generally, an actuator assembly 102 has a motor 101 that rotatably positions an actuator 103 that, in turn, supports a plurality of data transfer elements 104, such as transducers, at a distal end thereof. Host access commands are executed by the apparatus 100 to simultaneously store data to and retrieve data from a plurality of data storage discs 106.

A spindle assembly 108 presents the batch of discs 106 to the actuator assembly 102, rotating them in a data transfer relationship with the transducers 104. Note that in FIG. 2 the spindle assembly 108 is not shown for clarity sake. All these assemblies are supported upon a substantially immobile base 110 that is resistant to movement, such as a granite slab.

FIG. 1 depicts the apparatus 100 in a load/unload mode whereby the actuator assembly 102 is moved away from the spindle assembly 108, and a shroud 112 is pivoted away from an operable position where it partially encloses the discs 106. This permits unloading a batch of processed discs 106 from the spindle assembly 108, and then loading a next batch of discs 106 to be processed. Preferably, the discs 106 are supported on a removable hub having a clamp 114 at one end thereof for fixing the discs 106 in rotation, and having a quick connect feature 116 at the other end thereof for mounting the hub to the spindle assembly 108.

After the next batch of discs 106 is loaded to the spindle assembly 108, the apparatus 100 is returned to the operational mode depicted in FIG. 2. A comb 118 pivots toward the discs 106 to spreadingly engage the suspension members supporting the transducers 104, thereby creating a clearance between opposing transducers 104 sufficient for merging the discs 106 with the actuator 103. After merging, the comb 118 clearingly pivots away from the discs 106 as depicted in FIG. 2. Processing then begins by spinning the discs 106 and rotating the actuator 103 to present the transducers 104 to various storage locations of the respective discs 106.

Figure 3:
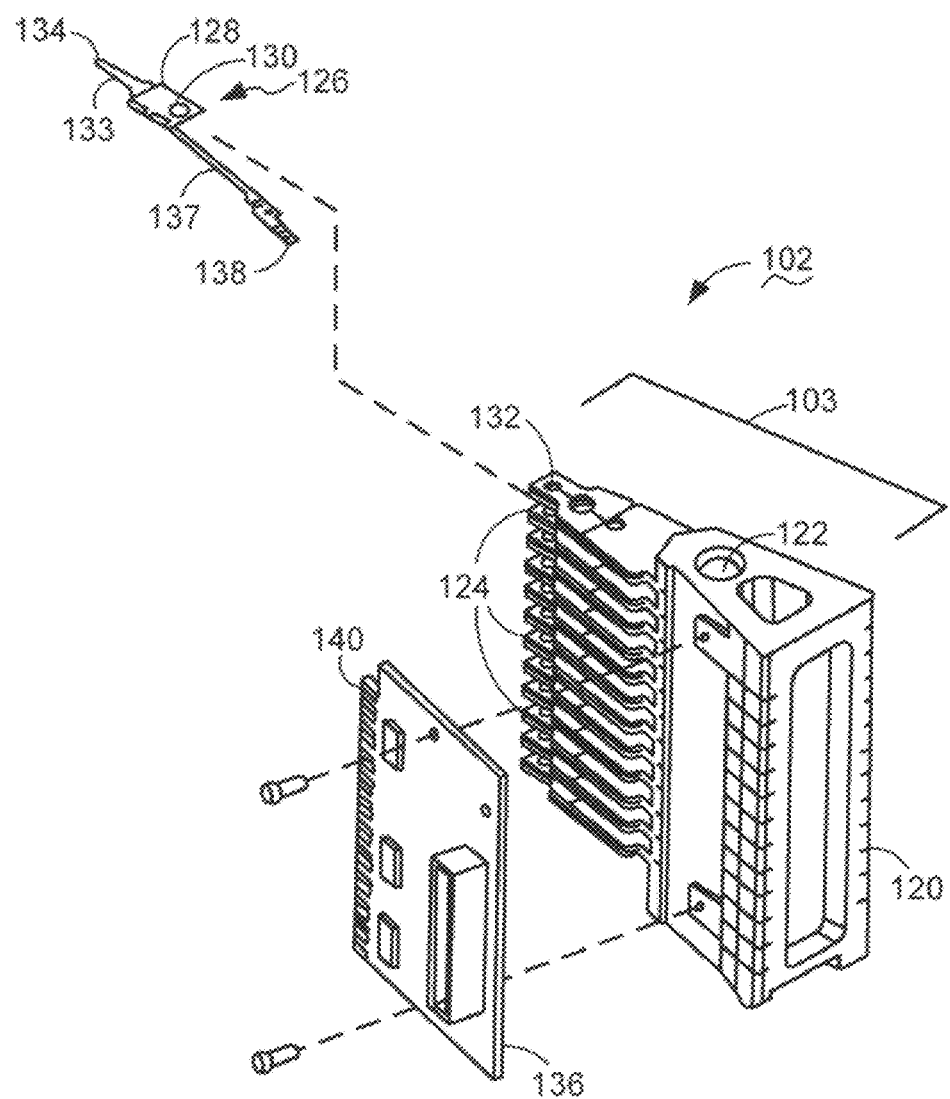
FIG. 3 is an exploded isometric view of the actuator assembly of the apparatus of FIG. 1.

FIG. 3 depicts an exploded view of an actuator assembly 102 that is constructed in accordance with previously attempted solutions. The actuator 103 has a substantially rigid body 120 defining a bore 122 into which a bearing (not shown) is receivingly engaged to journal the body 120 in rotation. A plurality of arms 124 are cantilevered from the body 120, each arm supporting either one or two flexure assemblies 126. The manner in which a flexure assembly 126 is attached to an arm 124 is described in detail below.

Generally, the arms 124 support flexure assemblies 126 so that when the arms 124 are operably merged with the discs 106 there is a flexure assembly 126 associated with each recording surface of the discs 106. Accordingly, each of the intermediate arms 124 can support a first flexure assembly 126 adjacent a recording surface of one disc 106 and a second flexure assembly 126 adjacent another recording surface of another disc 106. If there is no disc 106 outside the outermost arms 124 then those arms 124 each only support one flexure assembly 126.

The flexure assembly 126 generally has a base 128 defining a protuberant embossed member (or "boss") 130 that is used to affix the base 128 to the arm 124 by disposing it in a frictional engagement within a surface of the arm 124 defining an aperture 132. A suspension member 133 depends from the base 128 and supports, in turn, a data transfer member 134 at a distal end thereof.

A preamplifier 136 is attached to the body 120 and moves in rotation therewith. An electrical circuit 137 is connected at one end to the data transfer member 134 and is connected at the other end 138 to contacts 140 on the preamplifier 136. A medial portion of the electrical circuit 137 is supported along the arm 124 it traverses.

Figure 4:
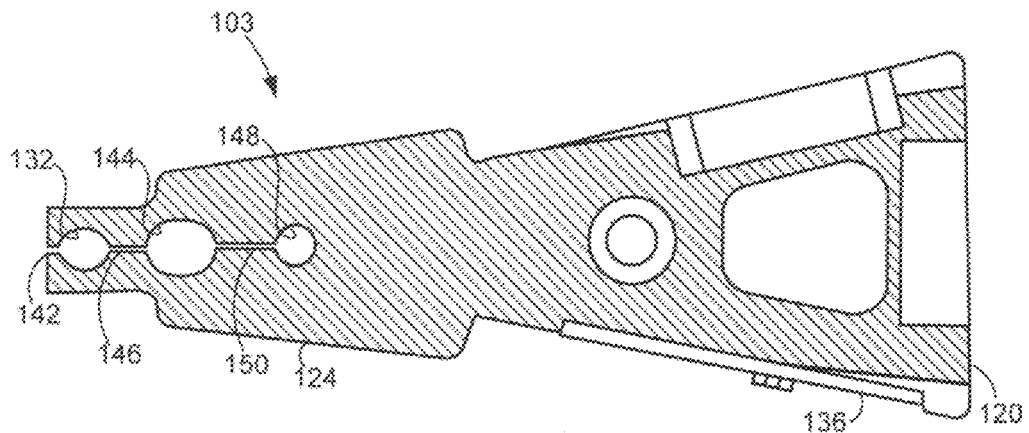
FIG. 4 is a cross sectional depiction of one of the anus of the actuator assembly depicted in FIG. 3.

FIG. 4 depicts a cross-sectional view of the actuator 103. The arm 124 defines a slot 142 that intersects the aperture 132. The slot 142 facilitates the process of elastically expanding the aperture 132 to a size that will clearingly receive the boss 130 (FIG. 3). After the boss 130 is received within the expanded aperture 132, it can then be retracted to frictionally affix the base 128 (FIG. 3) to the arm 124. In alternative equivalent embodiments that expansion can be achieved without the slot 142, such as depicted below in FIGS. 7 and 9.

The arm 124 furthermore defines a tooling aperture 144 and a slot 146 that intersects both apertures 132, 144. The tooling aperture 144 is oval-shaped so that it can admit a tool having a cam surface that, when the tool is rotated, pressingly engages against the surface defining the tooling aperture 144 to enlarge it. Enlargement of the tooling aperture 144 is transmitted via the slot 146 to likewise enlarge the aperture 132 for reason of admitting the boss 130 (FIG. 3). The arm 124 can furthermore define another aperture 148 and slot 150 to lessen the amount of force necessary to expand the aperture 132. This is particularly advantageous if another aperture is needed anyway, such as for supporting a shipping comb that attaches to the arms 124 and supports the suspensions 132 so that the data transfer members 134 are not damaged during transit or when merging with the discs.

Figure 5:
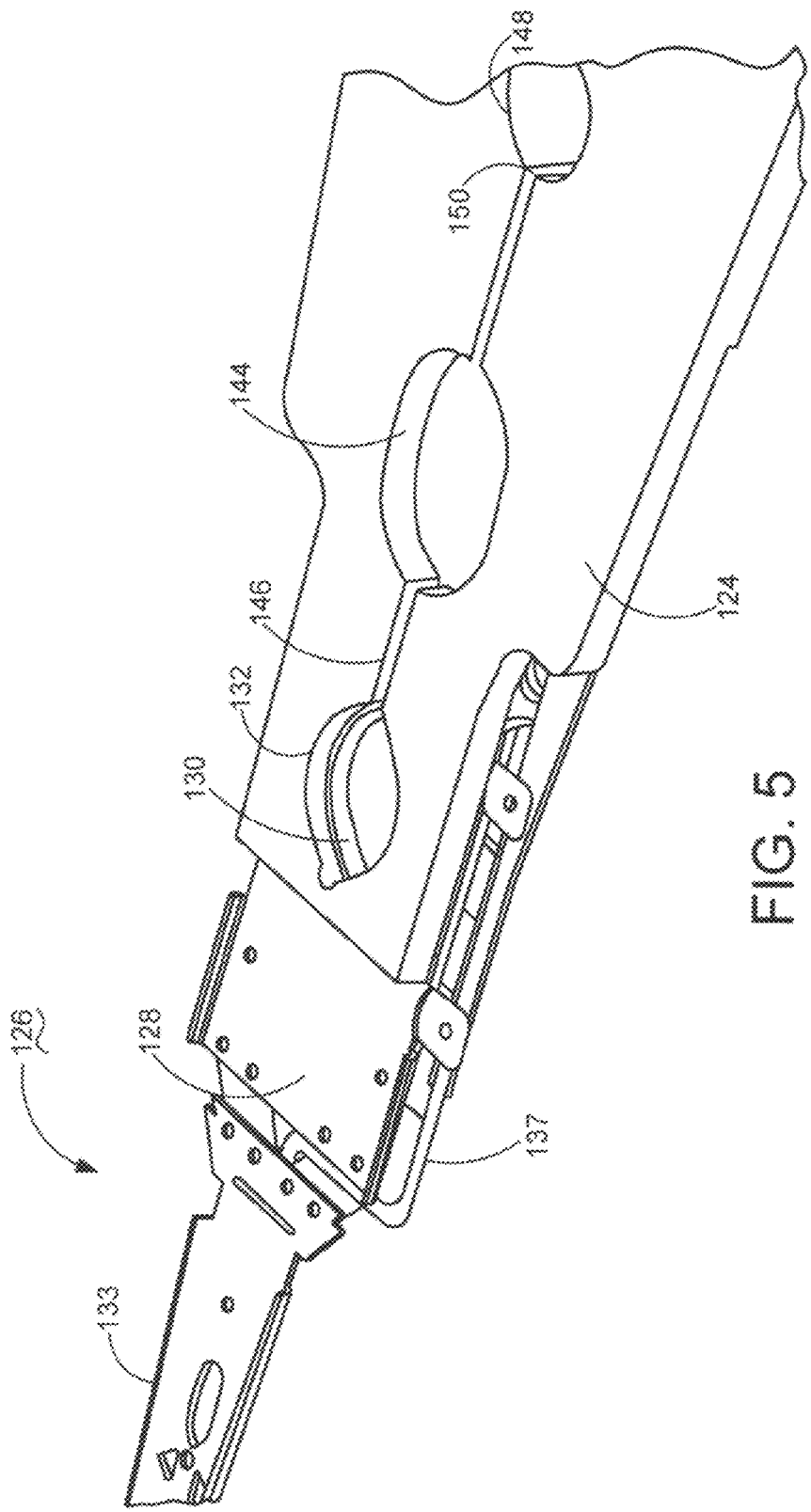
FIG. 5 is an isometric depiction of one of the arms of the actuator assembly depicted in FIG. 3 with a flexure assembly affixed to the arm.

FIG. 5 is an isometric depiction of the base 128 having been operably affixed to the arm 124 by frictionally engaging the boss 130 and the surface of the arm 124 defining the aperture 132. As described above, that frictional engagement is achieved by first elastically expanding the aperture 132, inserting the boss 130 within the aperture 132, then retracting the aperture 132 to pressingly engage the surface of the arm 124 defining the aperture 132 against the boss 130.

It will be noted that the frictional engagement is advantageously reversible. That is, if a flexure assembly 126 needs to be removed then the tool can easily be re-inserted into the tooling aperture 144 and operated to expand the aperture 132 enough that the boss 130 can clearingly slide out of the aperture 132. A flexure assembly 126 might need to be replaced if it is determined that rework or repair of the actuator assembly 102 is necessary. More predictably, the data transfer members 134 are changed out after a predetermined number of processing cycles in order to maintain a desired process reliability. However, it has been determined that it is not necessary to replace the electrical circuit 137 at the same frequency as the data transfer member 134 to achieve the desired process reliability. Furthermore, the portion of the electrical circuit 137 extending from the base 128 is typically constructed of a flexible substrate. The dangling nature of that construction makes it problematic to automate the switching out of a data transfer member 134. The present embodiments are directed to resolving these difficulties by alternatively constructing the flexure assembly 126 to be of a replaceable modular design.

Figure 6:
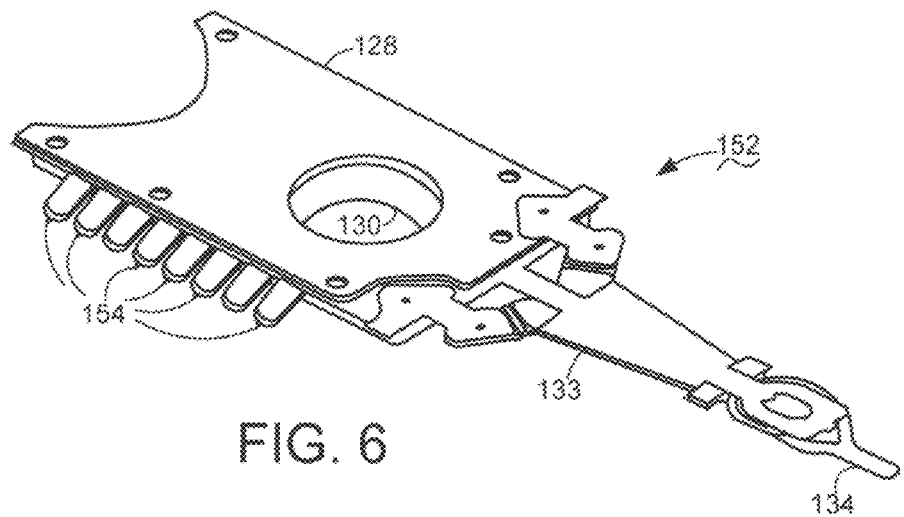
FIG. 6 is a modular flexure assembly that is constructed in accordance with embodiments of the present invention.
Figure 7:
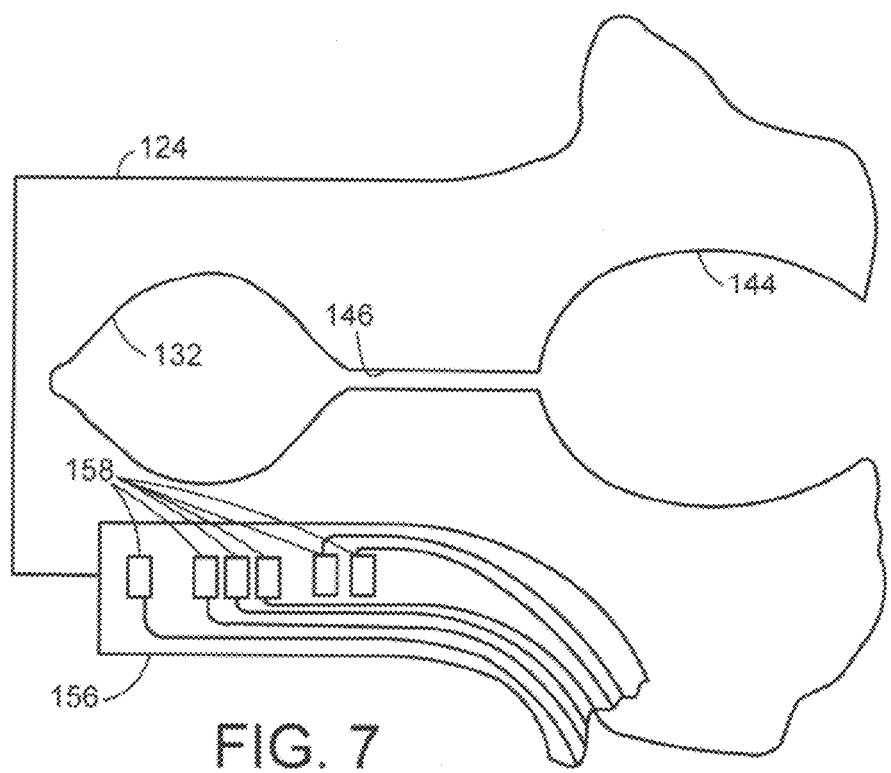
FIG. 7 is an enlarged depiction of a portion of an actuator assembly that is constructed in accordance with embodiments of the present invention.

FIG. 6 is an isometric depiction of a modular flexure assembly 152 that is constructed in accordance with embodiments of the present invention. Features like those described above in the flexure assembly 126 (FIG. 3) retain the same reference identifiers. However, instead of the electrical circuit 137 extending from the base 128 as in the flexure assembly 126, the flexure assembly 152 has an electrical circuit that is connected to the data transfer member 134 at one end and that terminates at one or more electrical contacts 154 at the other end. FIG. 7 depicts an enlarged view of the distal end of the arm 124, showing illustrative embodiments whereby the arm 124 supports a second electrical circuit 156 with electrical traces that ultimately connect at a far end (not shown) to the preamplifier 136 (FIG. 3) and that terminate at the other end at one or more electrical contacts 158. The contacts 158 are positioned on the arm 124 to matingly align with the contacts 154 on the base 128 when the boss 130 is operably disposed within the aperture 132.

It is not necessary to define the number of mating contacts or the signals they communicate for skilled artisan to understand the scope of the claimed subject matter. Generally, one or more the contacts 154, 158 are likely to be read contacts disposed within a read signal circuit, write contacts disposed within a write signal circuit, and ground contacts disposed in a ground circuit, between the data transfer member 134 (FIG.

3) and the preamplifier 136 (FIG. 3). Other contacts 154, 158 might be used as heater contacts in a heater circuit and temperature contacts to monitor temperature via a temperature circuit.

As described, the nominal diameter of the aperture 132 is less than the diameter of the boss 130, so that an interference fit is constructed therebetween. Generally, the arm 124 has an expanding feature, such as the tooling hole 144 and interconnected slot 146, permitting the user to selectively expand a diameter of the aperture 132 so that the boss 130 can be receivingly engaged in the aperture 132. A force can be applied to urge the mating contacts 154, 158 against each other during the time that the aperture 132 is expanded. Preferably, at least one of the sets of contacts 154, 158 are supported by a substrate in a manner forming a compressible spring member that operably urges the contacts 154, 158 toward each other in the mating contact. For example, the contacts 154 in FIG. 6 are depicted as being slanted at the distal ends toward the mating contacts 158. The force with which the contacts 154, 158 are pressingly engaged against each other is provided by the spring action of the slanted contacts 154, thereby urging the contacts into electrical contact. The forces with which the boss 130 is affixed to the arm 124 and the spring forces urging the mating contacts together make it possible to operably connect the contacts 154, 158 entirely by a pressing engagement, without the need for solder interconnecting them.

From the description heretofore the skilled artisan will readily understand that embodiments of the present invention include a method whereby the data transfer member 134 is selectively replaceable as part of a modular component. The method includes obtaining the arm 124 that defines the aperture 132 supporting the electrical circuit that terminates at the contact 158. The aperture 132 is then expanded. The method continues by obtaining the flexure assembly 152 that defines the boss 130 and that supports the second electrical circuit that terminates at the second contact 154. The flexure assembly 152 is positioned to receivingly engage the boss 130 within the aperture 132, thereby matingly engaging the contacts 154, 158 together. A force is applied that urges the contacts 154, 158 against each other. The method then contracts the aperture 132 to affix the flexure assembly 152 to the arm 124 and resultingly affix the contacts 154, 158 together to operably interconnect the electrical circuits in electrical communication. The force applied to urge the contacts against each other can be removed after contracting the aperture 132.

In some embodiments the method is characterized by obtaining the arm described above that defines the second aperture 144 and the slot 146 intersecting both apertures 132, 144, so that the expanding step can be characterized by inserting a tool into the second aperture 144 that operably expands the second aperture 144, such as by rotating the tool, and thereby, in turn, expands the aperture 132. In this illustrative case, the method is characterized by subsequently rotating the tool to contract the aperture 132.

Figure 8:
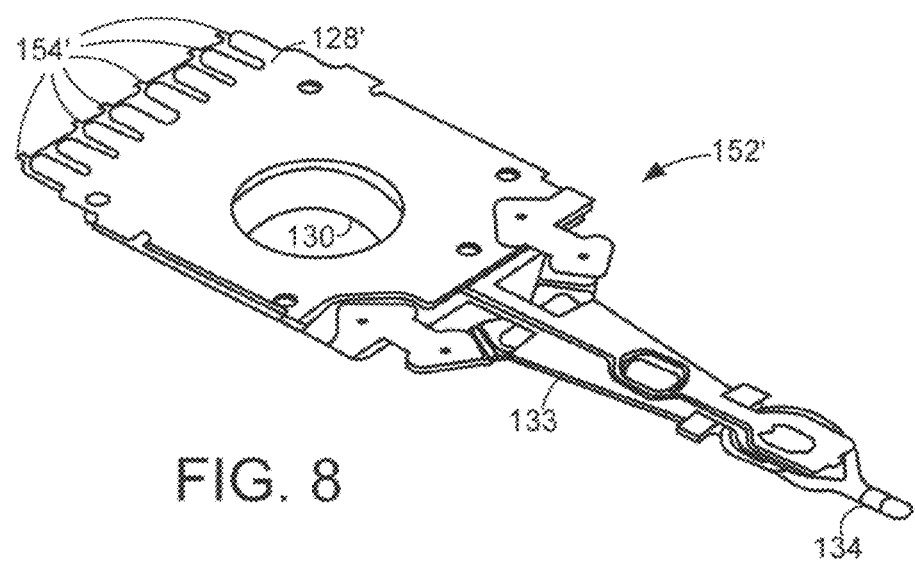
FIG. 8 is a modular flexure assembly that is constructed in accordance with alternative embodiments of the present invention.
Figure 9:
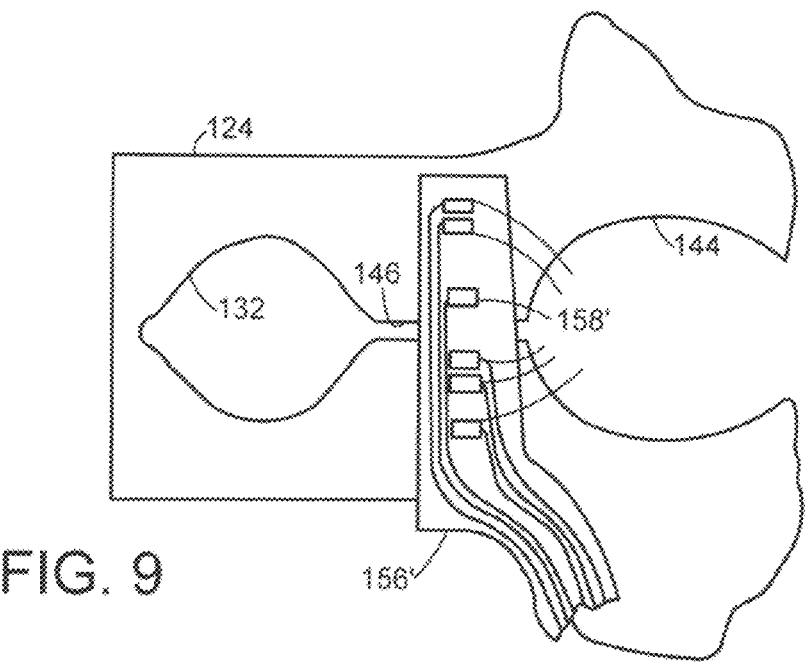
FIG. 9 is an enlarged depiction of a portion of an actuator assembly that is constructed in accordance with alternative embodiments of the present invention.

The claimed embodiments are not limited to the arrangement of the mating contacts 154, 158 depicted in the illustrative embodiments above. FIGS. 8 and 9, for example, depict equivalent alternative embodiments whereby the mating contacts 154', 158' are located so as to mate along a longitudinal axis of the arm 124 as opposed to one side of the arm as depicted in similar FIGS. 6 and 7.

Figure 10:
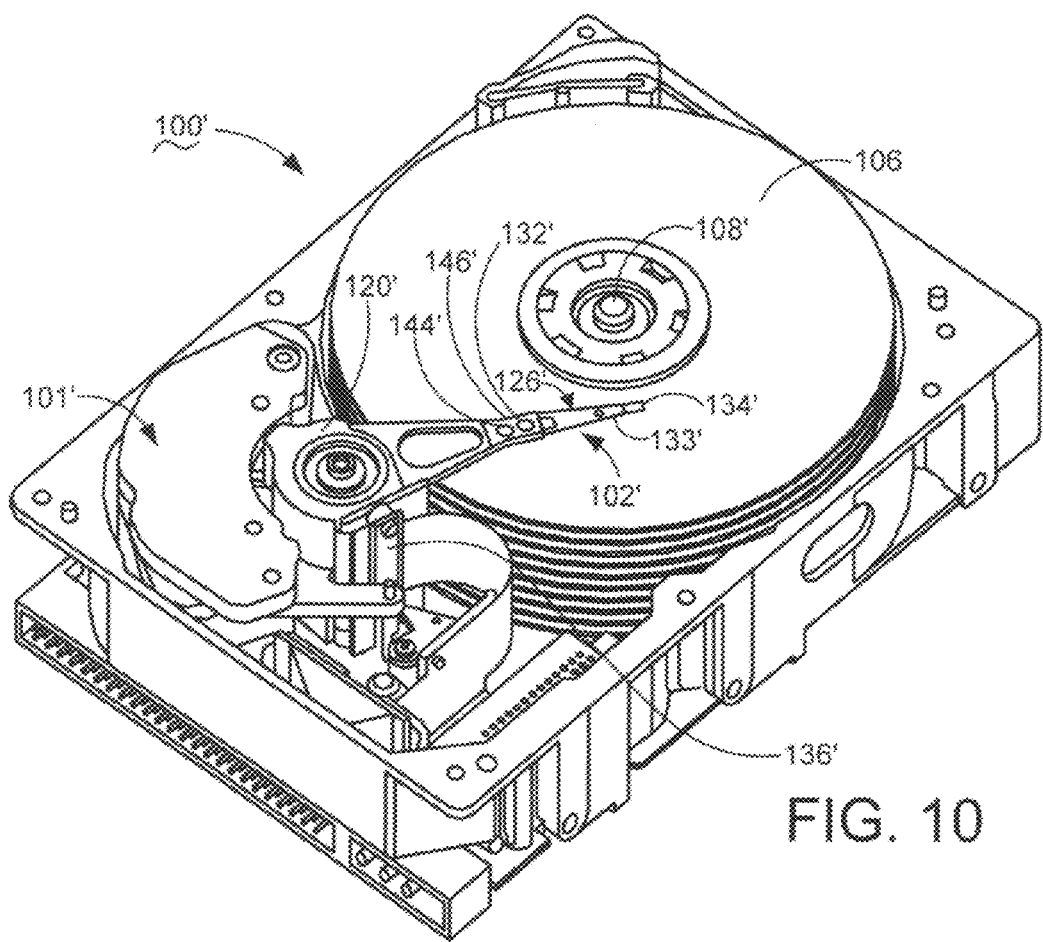
FIG. 10 is an isometric depiction of a data storage device in which embodiments of the present invention are useful.

In other equivalent alternative embodiments the claimed embodiments are well suited for practicing them in a data storage device 100' such as the one depicted in FIG. 10. Similar to that described above, a plurality of the discs 106 are arranged in a stack for common rotation on a spindle 108'. A motor 101' (such as a voice coil motor (VCM)) rotates an actuator assembly 102'. The actuator assembly 102' has a flexure assembly 126' that includes an arm 124' (e.g., a unimount or stacked arm), a suspension 133' supported by the arm 124', and a data transfer member 134'. A plurality of actuator arms 124' may be connected to a common body 120' for common rotation. Electrical circuits (not shown) routed along the arms 124' are used to connect the data transfer members 134' to a preamplifier 136'. The flexure assembly 126' is attached to the respective arm 124' by using a tool in the tooling aperture 144' to expand aperture 132', into which the boss 130' is inserted and there affixed to the arm when the aperture 132' is subsequently retracted.

Generally, the claimed embodiments contemplate a media processing apparatus having an amplifier and a data transfer member, with an interconnecting electrical circuit therebetween, and means for connecting a first portion of the electrical circuit to a second portion of the electrical circuit so that an assembly that includes the data transfer member is a modular replaceable component. For purposes of interpreting this description and the appended claims, the meaning of "means for connecting" includes only that structure disclosed herein and structural equivalents thereof that are capable of providing an assembly containing the data transfer member in the form of a modular replaceable component. An example of structure contemplated within the meaning of "means for connecting" includes the illustrative disclosed embodiments that have a first set of contacts on the flexure assembly that only frictionally engage a mating set of contacts on the arm. The meaning of "means for connecting" expressly does not include the structure associated with previously attempted solutions that permanently affixes the flexure assembly to the arm, such as by swaging, soldering, adhering, and the like, and does not include previously attempted solutions that combine the flexible circuit as part of the flexible assembly.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to illustrative embodiments describing data storage discs and devices processing and using them, it will be appreciated by those skilled in the art that the claimed subject matter is not so limited and various other systems can utilize the present embodiments without departing from the spirit and scope of the claimed invention.

What is claimed:
1. An actuator comprising:
an arm defining an aperture;
a first electrical circuit supported by the arm, the first electrical circuit terminating at a first contact;
a flexure assembly defining a boss and supporting a second electrical circuit that terminates at a second contact, the first and second contacts positionable in operable mating engagement with each other placing the first electrical circuit in electrical communication with the second electrical circuit when the boss is operably disposed within the aperture and there affixed to the arm.

2. The actuator of claim 1 wherein the aperture is of a nominal diameter that is less than a diameter of the boss to provide an interference fit therebetween.

3. The actuator of claim 1 wherein the arm comprises an expanding feature that selectively expands a diameter of the aperture to a size that permits the boss to be receivingly engaged in the aperture.

4. The actuator of claim 3 wherein the expanding feature comprises the arm defining a slot intersecting the aperture.

5. The actuator of claim 4 wherein the slot extends to a distal end of the arm.

6. The actuator of claim 4 wherein the expanding feature comprises the arm defining a second aperture, wherein the slot intersects both apertures.

7. The actuator of claim 1 wherein the flexure assembly further comprises a data transfer member, and wherein each of the first and second electrical circuits terminate at a plurality of electrical contacts.

8. The actuator of claim 7 wherein at least one of the plurality of electrical contacts in each of the first and second electrical circuits comprises a read contact in a read signal circuit of the data transfer member.

9. The actuator of claim 7 wherein at least one of the plurality of electrical contacts in each of the first and second electrical circuits comprises a write contact in a write signal circuit of the data transfer member.

10. The actuator of claim 7 wherein at least one of the plurality of electrical contacts in each of the first and second electrical circuits comprises a ground contact in a ground circuit of the data transfer member.

11. The actuator of claim 7 wherein at least one of the plurality of electrical contacts in each of the first and second electrical circuits comprises a heater contact in a heater circuit of the data transfer member.

12. The actuator of claim 7 wherein at least one of the plurality of electrical contacts in each of the first and second electrical circuits comprises a temperature contact in a temperature circuit of the data transfer member.

13. The actuator of claim 1 wherein at least one of the contacts is supported by a substrate forming a compressible spring member that operably urges the contacts toward each other in the operable mating engagement.

14. The actuator of claim 1 wherein the operable mating engagement is entirely a pressing engagement of the contacts against each other without solder interconnecting the contacts.

15. A method comprising:
obtaining an arm defining an aperture and supporting an electrical circuit that terminates at a contact;
expanding the aperture;
obtaining a flexure assembly defining a boss and supporting a second electrical circuit that terminates at a second contact;
positioning the flexure assembly to receivingly engage the boss within the aperture, thereby matingly engaging the contacts together;
contracting the aperture to affix the flexure assembly to the arm and resultingly affix the contacts together to operably interconnect the electrical circuits in electrical communication.

16. The method of claim 15 wherein the obtaining step is characterized by the arm defining a second aperture and further defining a slot intersecting both apertures, and wherein the expanding step is characterized by inserting a tool into the second aperture that operably expands the second aperture and thereby, in turn, expands the aperture.

17. The method of claim 15 wherein the expanding step is characterized by rotating the tool to engage a cam against the surface defining the second aperture.

18. The method of claim 17 wherein the contracting step is characterized by rotating the tool to disengage the cam from the surface defining the second aperture.

19. The method of claim 15 wherein the positioning step is characterized by applying a force that pressingly engages the contacts together until after completion of the retracting step.

20. A media processing apparatus comprising:
an amplifier and a data transfer member, with an interconnecting electrical circuit therebetween; and
means for connecting a first portion of the electrical circuit to a second portion of the electrical circuit so that an assembly that includes the data transfer member is a modular replaceable component.

* * * * *